(12) United States Patent
Jacksteit et al.

(10) Patent No.: US 11,248,728 B2
(45) Date of Patent: Feb. 15, 2022

(54) LINE COUPLING AND CONTAINER HAVING THE SAME

(71) Applicant: NORMA Germany GmbH, Maintal (DE)

(72) Inventors: Bruno Jacksteit, Hammersbach (DE); Dennis Unger, Rodenbach (DE)

(73) Assignee: Norma Germany GmbH, Maintal (DE)

(*) Notice: Subject to any disclaimer, the term of this patent is extended or adjusted under 35 U.S.C. 154(b) by 0 days.

(21) Appl. No.: 16/114,865

(22) Filed: Aug. 28, 2018

(65) Prior Publication Data

US 2019/0063658 A1 Feb. 28, 2019

(30) Foreign Application Priority Data

Aug. 28, 2017 (DE) .......................... 102017119704.4

(51) Int. Cl.
*F16L 37/02* (2006.01)
*F16L 59/06* (2006.01)
(Continued)

(52) U.S. Cl.
CPC .............. *F16L 37/02* (2013.01); *B65D 25/48* (2013.01); *B65D 55/04* (2013.01); *B65D 83/32* (2013.01);
(Continued)

(58) Field of Classification Search
CPC ................ B67D 1/0802; B67D 7/0288; Y10T 137/86348; Y10T 137/86372;
(Continued)

(56) References Cited

U.S. PATENT DOCUMENTS

| | | | | |
|---|---|---|---|---|
| 687,357 A | * | 11/1901 | Wellington | ............ B60K 15/06 137/590 |
| 2,123,809 A | * | 7/1938 | Seitz | ....................... F24H 9/124 137/592 |

(Continued)

FOREIGN PATENT DOCUMENTS

| | | |
|---|---|---|
| DE | 3540870 A1 | 5/1987 |
| DE | 69101735 T2 | 8/1994 |

(Continued)

OTHER PUBLICATIONS

First German Office Action for German Patent Application No. 10 2017 119 704.4 dated Jul. 30, 2018, 9 pages.
(Continued)

*Primary Examiner* — Atif H Chaudry
(74) *Attorney, Agent, or Firm* — Reising Ethington, P.C.

(57) ABSTRACT

A line coupling having a housing which has a tube connection piece and a housing head. A passage duct extends from a first opening, which is formed by the tube connection piece, to a second opening, which is formed by the housing head. A tube connection structure is arranged in the passage duct. The tube connection structure is connected in a form-fitting manner via first coupling means to a first end of an inner tube which extends out of the housing head through the second opening. The section of the passage duct between the first opening and tube connection structure and inner tube form a flow duct for fluid. A container is also disclosed having a container housing which forms a container hollow space and a container opening. The container opening is formed by an outwardly projecting connection piece, and has a line coupling.

19 Claims, 2 Drawing Sheets

(51) Int. Cl.
| | |
|---|---|
| *F16L 39/00* | (2006.01) |
| *F16L 47/02* | (2006.01) |
| *F16L 59/16* | (2006.01) |
| *B67D 1/08* | (2006.01) |
| *B65D 83/32* | (2006.01) |
| *B67D 7/02* | (2010.01) |
| *B65D 55/04* | (2006.01) |
| *B65D 25/48* | (2006.01) |
| *F16L 37/60* | (2006.01) |
| *F16L 37/088* | (2006.01) |

(52) U.S. Cl.
CPC ......... *B67D 1/0802* (2013.01); *B67D 7/0288* (2013.01); *F16L 37/60* (2013.01); *F16L 39/005* (2013.01); *F16L 47/02* (2013.01); *F16L 59/06* (2013.01); *F16L 59/166* (2013.01); *F16L 37/088* (2013.01); *Y10T 137/86348* (2015.04); *Y10T 137/86372* (2015.04)

(58) Field of Classification Search
CPC ....... F16L 37/025; F16L 37/02; F16L 37/088; B65D 25/48; B65D 55/04; B65D 83/32
See application file for complete search history.

(56) References Cited

U.S. PATENT DOCUMENTS

| | | | | |
|---|---|---|---|---|
| 4,229,024 A | * | 10/1980 | Oberrecht | F16L 27/0845 285/98 |
| 4,751,778 A | * | 6/1988 | Gray | E21B 17/042 29/401.1 |
| 4,923,350 A | * | 5/1990 | Hinksman | F16L 37/144 411/457 |
| 5,356,045 A | * | 10/1994 | Parks | B67D 1/0802 220/214 |
| 5,360,242 A | * | 11/1994 | Argent | E21B 17/0426 228/189 |
| 6,543,654 B1 | | 4/2003 | Uhl et al. | |
| 6,860,420 B2 | * | 3/2005 | Filippov | B23K 20/16 228/246 |
| 7,516,989 B2 | | 4/2009 | Yoshida | |
| 2007/0154317 A1 | * | 7/2007 | Cairo | F03D 1/0658 416/230 |
| 2010/0287740 A1 | | 11/2010 | Rigollet et al. | |
| 2011/0287740 A1 | | 11/2011 | Vos et al. | |
| 2012/0086197 A1 | | 4/2012 | Bauer et al. | |
| 2013/0060347 A1 | * | 3/2013 | McMinn | A61F 2/3603 623/23.23 |
| 2015/0013819 A1 | * | 1/2015 | Stewart | B29C 53/822 138/109 |
| 2016/0288149 A1 | | 10/2016 | Koland et al. | |
| 2017/0118483 A1 | | 4/2017 | Yu et al. | |

FOREIGN PATENT DOCUMENTS

| | | |
|---|---|---|
| DE | 29610026 U1 | 9/1996 |
| DE | 10320065 A1 | 11/2003 |
| DE | 102012108791 A1 | 3/2014 |
| DE | 102016109589 A1 | 12/2016 |
| EP | 0330871 A1 | 9/1989 |
| JP | S6295126 A | 5/1987 |
| JP | S6295126 U | 6/1987 |
| JP | H0738626 A | 2/1995 |
| JP | H0738626 U | 7/1995 |
| JP | 2004125036 A | 4/2004 |
| JP | 2008057423 A | 3/2008 |
| JP | 2017129231 A | 7/2017 |
| KR | 101322876 B1 | 10/2013 |
| WO | WO2017118483 A1 | 7/2017 |

OTHER PUBLICATIONS

Japanese Office Action for Application No. 2018-155142 dated Aug. 6, 2019 (8 pages).
English Translation of Japanese Office Action for Application No. 2018-155142 dated Aug. 6, 2019 (15 pages).
Chinese Office Action for Chinese Application No. 201810980723.0 dated Mar. 5, 2020 (8 pages).
Korean Office Action for Korean Application No. 10-2018-0101339 dated Jan. 28, 2020 (7 pages).
English Translation of Korean Office Action for Korean Application No. 10-2018-0101339 dated Jan. 28, 2020 (6 pages).

* cited by examiner

LINE COUPLING AND CONTAINER HAVING THE SAME

CROSS-REFERENCE TO RELATED APPLICATION

This application claims the benefit of German Patent Application No. 10 2017 119 704.4, filed Aug. 28, 2017, the entire contents of which are hereby incorporated by reference.

TECHNICAL FIELD

The disclosure relates to a line coupling and, more particularly, to a container having such a line coupling.

BACKGROUND

Line couplings serve for connection of lines to other lines or for connection to a container and the like. EP 0 330 871 A1 discloses a line coupling which has a housing which is composed of a tube connection piece and a housing head. A passage duct extends from a first opening, which is formed by the tube connection piece, to a second opening, which is formed by the housing head. The manner in which a connection piece is inserted into the housing head is also shown, wherein sealing elements are arranged between the housing head and the connection piece.

A disadvantage of this configuration is that it is actually only possible for fluid to be conducted into a container which is closed off by way of the housing head. However, liquid removal is not possible if the container has a fill level which is below the housing head.

SUMMARY

It is therefore one object of the disclosure to develop a line coupling which overcomes the disadvantages of the prior art and is suitable for closing off a container opening by way of the housing head and also for allowing fluid removal from the container if the fill level is below the housing head. The solution may be simple, cost-effective and as flexible as possible regarding the location of use. Other objects of the disclosure may exist.

The disclosure relates to a line coupling having a housing which has a tube connection piece and a housing head, wherein a passage duct extends from a first opening, which is formed by the tube connection piece, to a second opening, which is formed by the housing head. A tube connection structure is arranged in the passage duct, wherein the tube connection structure is connected in a form-fitting manner via first coupling means to a first end of an inner tube which extends out of the housing head through the second opening, and wherein that section of the passage duct which is between the first opening and the tube connection structure and the inner tube form a flow duct for fluid.

One advantage of this configuration is that the inner tube can project into a region beneath the fill level in a container. In this way, fluid can be removed even when fill levels are low. An inner tube having a desired length is able to be inserted through the tube connection structure according to the usage case. The further components of the line couplings may be used even in the case of different removal depths. In this way, the production and storage costs are low owing to large unit quantities of a small number of individual parts. The actual flow duct is thus formed in the direction of the second opening from the tube connection structure preferably by the inner tube. The tube connection structure and the tube connection piece preferably extend the flow duct in the direction of the first opening.

For reasons of cost and for high operational reliability, the housing should be produced in one piece. Moreover, the cross-sectional area of the second opening should be larger than the cross-sectional area of the first opening by a multiple, at least two times.

In one embodiment of the line coupling, the first coupling means form a plug connection. This is simple to fit and can optionally also be designed such that it is able to be dismounted. Preferably, the tube connection structure projects into the inner tube. This allows the inner tube to have a larger line cross section. In a more specific configuration, the tube connection structure has, on its outer side, at least one retaining lug which engage into the inner tube from the inside. Preferably, it is a circumferential retaining lug. This increases the sealing action and tensile strength by generating radial stress. Optionally, the first coupling means are alternatively or additionally connected to one another in a materially bonded manner, for example welded or adhesively bonded to one another. In this way, a particularly firm, well-sealed and vibration-resistant connection is provided.

According to another embodiment, the tube connection structure is of sleeve-like form. A sleeve is hollow and may at the same time have a small diameter, which allows a compact design. In particular, the tube connection structure should form a part-section of the flow duct.

In principle, the tube connection structure may be formed in one piece with the housing. This results in low production costs. According to an embodiment, the tube connection structure is formed by a connection element which is fixed in a form-fitting manner and/or materially bonded manner in a receiving seat of the housing. This allows the connection element or tube connection structure to be formed from a material which differs from the housing. The material may in particular satisfy the requirements for the tube connection structure. Thus, in the case of a small wall thickness, high strength is achievable and the flow cross section is tapered only slightly. Material bonding can be achieved by adhesive bonding, welding and also by injection molding of the housing on the tube connection structure or injection molding of the tube connection structure on the housing.

In one variant embodiment, it is provided that the connection element forming the tube connection structure has, on the outer side, at least two, preferably at least three, and particularly preferably exactly three, cylindrical steps by way of which the connection element is seated in steps of the receiving seat. As a result of the steps, the connection element and thus the tube connection structure are centered in a stepwise manner during the fitting, and the static friction during the final insertion is active only over a short pushing-in distance. Moreover, cylindrical contact surfaces and end-side contact surfaces adjoin one another in an alternating manner. This results in stable meshing with the housing and at the same time a small structural height. Optionally, the tube connection structure or connection element is alternatively or additionally connected to the housing in a materially bonded manner, for example welded or adhesively bonded thereto. In this way, a particularly firm, well-sealed and vibration-resistant connection is provided. Ultrasonic welding, for example, is suitable. The maximum outer diameter of the connection element is preferably larger than the outer diameter of the inner tube. In this way, relatively large torques can be transmitted.

Furthermore, in an embodiment a configuration in which the tube connection structure has a cylindrical inner diameter, preferably with a constant inner cross-sectional area over the length of the tube connection structure, is preferable. In this way, the tube connection structure does not form any significant tapering of the flow duct. Of preference in an embodiment is a design such that the minimum inner cross-sectional area of the tube connection structure substantially corresponds to the minimum cross-sectional area of the passage duct in the region between the tube connection structure and the first opening, wherein there is preferably a maximum difference of 20%, more preferably a maximum difference of 15%, and particular preferably a maximum difference of 10%, between the two cross-sectional areas. In this way, the tube connection structure does not constitute any significant impairment of the flow cross section.

According to one embodiment, between the inner tube and the housing head, there is formed an annular gap which is of open form in the direction of the second opening, in particular for the pushing-in of a connection piece, for example of a tube or a container connection piece. The annular gap is suitable for the pushing of the housing head onto a sleeve-like counterpart and for the pushing of the inner tube into said sleeve-like counterpart.

Furthermore, in one variant embodiment of the line coupling, it is provided that the housing forms, on the inner side of the housing head, a seal seat in which a sealing ring is arranged. This allows closing-off in a sealed manner by the housing head together with a sleeve-like counterpart. The sealing ring may be an O-ring seal. These are available at low cost as standard components, and replacements are easy to find.

For a simple production of the housing without undercuts in the passage duct, one embodiment in which the sealing ring is retained in the seal seat by means of a fixing ring which is inserted into the housing head of the housing is possible. Preferably, the fixing ring is arranged adjacent to the sealing ring on the side of the second opening. Optionally, it is possible for the fixing ring to be welded to the housing, for example ultrasonically welded thereto. However, configurations with an adhesive connection or with a form-fitting connection, for example an elastic securing bracket or circlip, are also possible. The sealing ring and/or the fixing ring should in each case be arranged spaced apart from the inner tube. In this way, an annular gap for the pushing-in of a sleeve-like counterpart remains.

According to one embodiment, on the inner side of the housing head, the housing has, in front of and/or behind the seal seat, at least one cylindrical centering step. Consequently, the sealing ring is centered in relation to a sleeve-like counterpart such that a uniform pressure acts on the seal and a uniform sealing action is to be expected over the circumference.

In one embodiment, it is also provided that the inner tube has a second end on which there is arranged a distributor cap which at least partially deflects the flow direction in the region of the second end of the inner tube, preferably in multiple directions, and particularly preferably by means of multiple outlet holes with different outlet directions and/or by means of an impact plate. In this way, it is possible to avoid the situation in which, for example, hot fluid is directed in a concentrated manner to a point on a container wall, or also in which deposited floating particles are drawn in from the container bottom.

In one embodiment, the second end of the inner tube is connected in a form-fitting manner via second coupling means to the distributor cap. This allows simple fitting. In one embodiment of the line coupling, the second coupling means form a plug connection. This may be simple to fit and can optionally also be designed such that it is able to be dismounted. Preferably, the distributor cap projects into the inner tube. This allows the inner tube to have a larger line cross section. In a more specific configuration, that section of the distributor cap which projects into the inner tube has, on the outer side, at least one retaining lug which engage into the inner tube from the inside. Preferably, it may be a circumferential retaining lug. This increases the sealing action and tensile strength by generating radial stress. Optionally, the second coupling means are alternatively or additionally connected to one another in a materially bonded manner, for example welded or adhesively bonded to one another. In this way, a particularly firm, well-sealed and vibration-resistant connection is provided.

Furthermore, in another embodiment, it is provided that closure means for the fixing of the housing head are arranged on the housing, in particular in the region of the housing head. Consequently, it is possible for the housing head to be fixed, in particular in a releasable manner, to a counterpart. Preferably, the closure means is a securing bracket or a clip.

Furthermore, the tube connection piece may optionally have, on its outer side, a fastening profile, preferably a fir tree profile or a profile in the manner of a rotated sawtooth function. This fastening profile allows a line pushed thereon, a tube or a hose to be firmly held.

A cost-effective production may be achievable by way of a configuration in which the passage duct exclusively widens in the direction of the second opening from the tube connection structure, in particular such that a first tool core is able to be pulled out of the second opening.

Also contributing to a cost-effective production is an optional design in which the passage duct exclusively widens in the direction of the first opening from the tube connection structure, in particular such that a second tool core is able to be pulled out of the first opening.

In one embodiment, a butt seam, which is formed in particular by a separating line between the first tool core and the second tool core, is formed in the passage duct between the tube connection structure and the first opening.

A further variant embodiment is that the connection piece has, on the outside, at least one cylindrical centering step, preferably at least two, which preferably correspond to one or more cylindrical centering steps of the housing head, as are described above and below. Consequently, it is possible for the seal to achieve a uniform sealing action over its circumference.

In order, for example, to make possible a flat construction of the housing head and the connected lines above a container, an embodiment in which the first opening points in a different direction than the second opening, wherein the first opening is preferably oriented transversely to the second opening, is possible. For this purpose, the passage duct preferably has, between the tube connection structure and the first opening, a change of direction, preferably a bend.

In the case of a hot fluid being used, an embodiment variant in which the inner tube consists at least substantially of PA (polyamide) is possible. The housing preferably consists at least substantially of PA (polyamide) and optionally contains glass fibers for reinforcement. The fixing ring preferably consists at least substantially of PA (polyamide) and optionally contains glass fibers for reinforcement. For the tube connection structure, a material which consists at least substantially of PA (polyamide) and optionally contains glass fibers for reinforcement is preferred. Alternatively, the tube connection structure or connection element may also consist of metal. The closure means may consist of a plastic or of metal. The distributor cap preferably consists of a PPS (polyphenylene sulphide) material.

In yet another embodiment, the disclosure also relates to a container having a container housing which forms a container hollow space and a container opening, wherein the container opening is formed by an outwardly projecting connection piece, and having a line coupling as described above and below, wherein the housing head of the line coupling covers the container opening, and wherein the inner tube of the line coupling projects into the container hollow space through the connection piece of the container housing.

One advantage of this configuration in an embodiment is that the inner tube can project into a region beneath the fill level in the container. For this purpose, the container opening is preferably arranged geodetically at the top of the container housing, and the inner tube extends vertically downwards. In this way, fluid can be removed even when fill levels are low. The container may in particular be an expansion tank. An inner tube having a desired length is able to be inserted through the tube connection structure according to the usage case. The further components of the line couplings may be used even in the case of different removal depths. In this way, the production and storage costs are low owing to large unit quantities of a small number of individual parts.

In one optional embodiment, the connection piece has an outer cylindrical sealing surface which preferably, together with a sealing ring of the line coupling, as is described above, forms a seal.

Preferably, in an embodiment, the housing head of the housing is fixed to the connection piece so as to be axially fixed and rotatable. Consequently, the fitting is simple, and a connected line can be oriented in a desired direction according to the usage case of the container.

According to an embodiment variant, the connection piece has closure means which preferably correspond to closure means of the housing of the line coupling, as are described in particular above, such that the housing head is fixed to the connection piece.

In one embodiment, it is provided that an annular gap is formed between the inner tube and the connection piece, wherein the inner tube and the connection piece preferably do not make contact at any position. In this way, it is possible for example for hot fluid to be conducted into cooler fluid in the container without the connection piece and/or the container being directly subjected to the heat of the hot fluid. After all, the connection piece and/or the container preferably consist at least substantially of PP (polypropylene). Said material is less temperature-resistant than the preferred material PA (polyamide) of the inner tube.

BRIEF DESCRIPTION OF THE DRAWINGS

Further features, details and advantages of the invention will emerge from the wording of the claims and from the following description of exemplary embodiments on the basis of the drawings. In the drawings:

DETAILED DESCRIPTION

Figure 1:
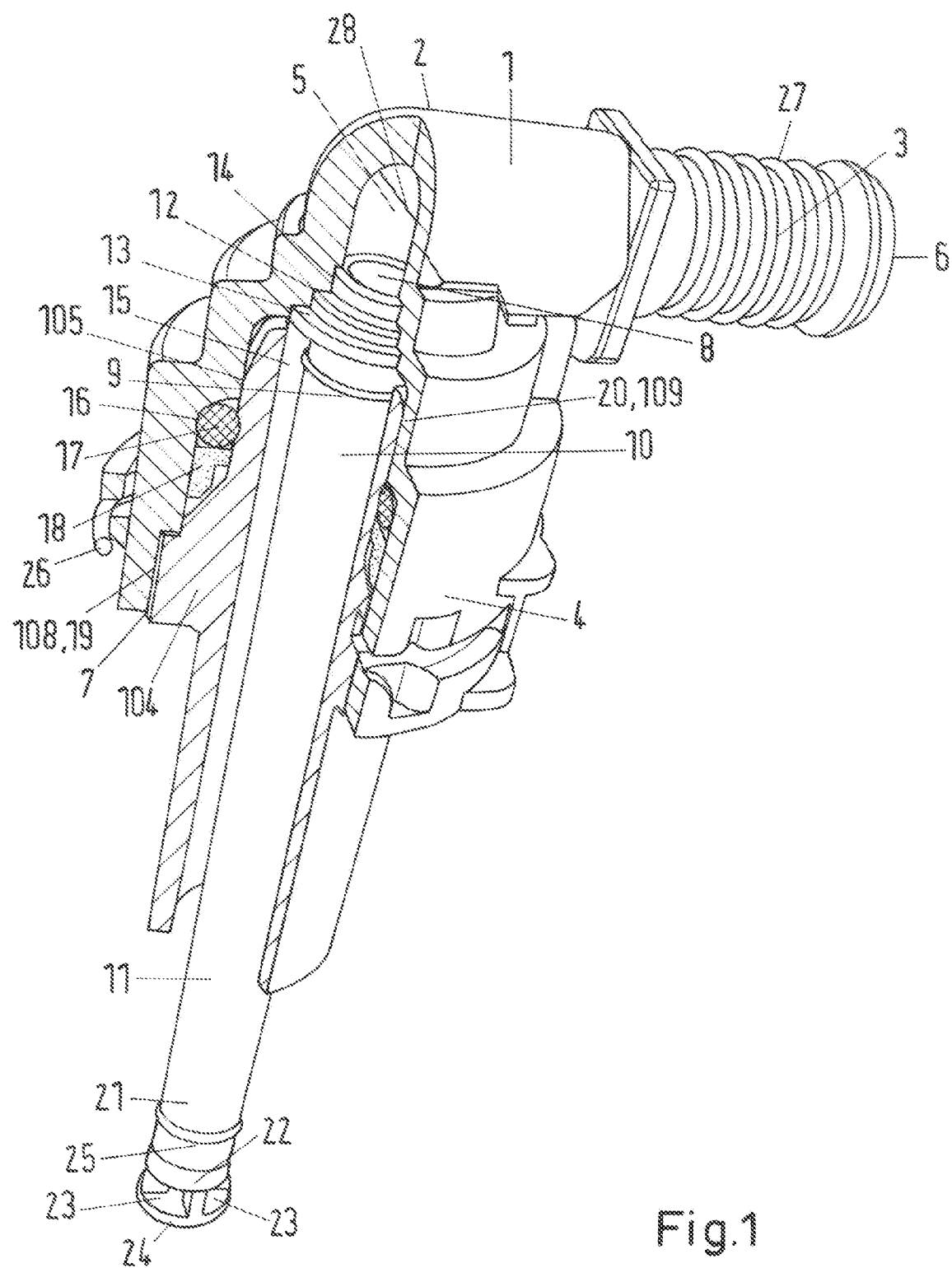
FIG. 1 shows a perspective view with a 90° partial section of a line coupling and of a connection piece.

FIG. 1 shows, in a perspective view with a 90° partial section, embodiments of a line coupling 1 and a connection piece 104. The main element of the line coupling 1 is a one-piece housing 2 which has a tube connection piece 3 and a housing head 4. A passage duct 5 extends from a first opening 6 of the housing 2, which is formed by the tube connection piece 3, to a second opening 7 of the housing 2, which is formed by the housing head 4. The cross-sectional area of the second opening 7 is larger than the cross-sectional area of the first opening 6 by a multiple. The tube connection piece 3 has, on its outer side, a fastening profile 27, which may be reworded as "fir tree profile" or as "a profile in the manner of a rotated sawtooth function". A line, for example a tube or a hose, may be pushed and fixed, for example by way of a tube clip, onto the tube connection piece 3.

A sleeve-like tube connection structure 8 which is formed as a separate connection element is inserted and fastened in the passage duct 5. For this purpose, the tube connection structure 8 or connection element is fixed at least in a form-fitting manner, optionally also in a materially bonded manner, in a receiving seat 12 of the housing 2. It can be seen that the tube connection structure 8 or connection element has, on the outer side, three cylindrical steps 13 by way of which it is seated in steps 14 of the receiving seat 12. The maximum diameter of the tube connection structure 8 or connection element is larger than the maximum diameter of the first opening 6, but smaller than the diameter of the second opening 7. In this way, the tube connection structure 8 can be fitted in the passage duct 5 from the direction of the second opening 7. In the region between the tube connection structure 8 and the first opening 6, the passage duct 5 has a smaller diameter than the tube connection structure 8. In the region between the tube connection structure 8 and the second opening 7, the passage duct 5 has a larger diameter than the tube connection structure 8.

Furthermore, the tube connection structure 8 has a cylindrical inner diameter which forms a constant inner cross-sectional area over the length of the tube connection structure 8. The minimum inner cross-sectional area of the tube connection structure 8 substantially corresponds to the minimum cross-sectional area of the passage duct 5 in the region between the tube connection structure 8 and the first opening 6. Preferably, there is a maximum difference between the cross-sectional areas of 20%, more preferably a maximum difference of 15%, and particularly preferably a maximum difference of 10%.

The passage duct widens in the direction of the second opening 7 from the tube connection structure 8 such that a first tool core is able to be pulled out of the second opening 7. The passage duct 5 also widens in the direction of the first opening 6 from the tube connection structure 8 such that a second tool core is able to be pulled out of the first opening 6. A butt seam 28, which results in particular from the separating line between the first tool core and the second tool core, is formed in the passage duct 5 between the tube connection structure 8 and the first opening 6.

In the region of the butt seam 28, that is to say between the tube connection structure 8 and the first opening 6, the passage duct 5 changes direction in the manner of a ninety degree (90°) bend. In this way, the first opening 6 is oriented transversely to the second opening 7 and the tube connection piece 3 is oriented transversely to the tube connection structure 8.

Furthermore, the tube connection structure 8 is connected in a form-fitting manner via first coupling means 9 to a first end 10 of an inner tube 11 which extends out of the housing head 4 through the second opening 7. That section of the passage duct 5 which is situated between the first opening 6 and the tube connection structure 8, the tube connection structure 8 and the inner tube 11 form a flow duct for fluid. The first coupling means 9 are formed as a plug connection, wherein the tube connection structure 8 projects into the inner tube 11. Here, the maximum outer diameter of the tube connection structure 8, which diameter in particular is outside the inner tube 11, is larger than the outer diameter of the inner tube 11. It is optionally possible for the first coupling means 9 to be connected to one another in a materially bonded manner, for example adhesively bonded or welded to one another.

The interfaces of the tube connection structure 8 are in particular of fluid-tight form, with the result that, in the region of the tube connection structure 8, no fluid can flow from the flow duct into an annular region between the inner tube 11 and the housing head 4. Between the inner tube 11 and the housing head 4, there is formed in particular an annular gap 15 which is of open form in the direction of the second opening 7. The connection piece 104 is pushed into said annular gap 15.

The housing 2 forms, on the inner side of the housing head 4, a seal seat 16 in which a sealing ring 17, in particular an O-ring, is arranged. The sealing ring 17 is retained in the seal seat 16 with the aid of a fixing ring 18. The fixing ring 18 is inserted into the housing head 4 of the housing 2 and is arranged adjacent to the sealing ring 17 on the side of the second opening 7. Preferably, the fixing ring 18 is connected to the housing 2 in a materially bonded manner, in particular welded thereto. Both with an inserted connection piece 104 and without said piece, the sealing ring 17 and the fixing ring 18 are positioned so as to be spaced apart from the inner tube 11. The connection piece 104 has an outer cylindrical sealing surface 105 which, together with the sealing ring 17, forms a seal.

It can further be seen that, on the inner side of the housing head 4, the housing 2 has, in front of and behind the seal seat 16, in each case one cylindrical centering step 19, 20. These two cylindrical centering steps 19, 20 correspond to two centering steps 108, 109 which are formed on the outer side of the connection piece 104.

The inner tube 11 runs straight and has a second end 21 on which a distributor cap 22 is arranged. The distributor cap 22 deflects the flow direction of the flow duct in the region of the second end 21 of the inner tube 11. For this purpose, the distributor cap 22 has outlet holes 23, which are distributed over the circumference, and an end-side impact plate 24. This results in outflowing fluid being deflected in a star-shaped manner in different directions.

The distributor cap 22 is connected in a form-fitting manner via second coupling means 25 to the second end 21 of the inner tube 11. In particular, the second coupling means 25 form a plug connection, wherein the distributor cap 22 projects into the inner tube 11.

In the region of the housing head 4, a closure means 26, that is to say a securing bracket, for fixing the housing head 4 to the connection piece 104 can be seen on the housing 2. The securing bracket is positioned on the outer side of the housing head 4 by way of ribs or projections and openings, wherein apertures, in particular slot-shaped apertures, are formed in the housing head 4, through which apertures the securing bracket is able to project into the interior of the housing head 4. Here, after being fitted on the connection piece 104, the securing bracket engages into a corresponding, preferably circumferential, securing groove in the connection piece 104.

The inner tube 11 consists at least substantially of PA (polyamide), and the connection piece 104 consists at least substantially of PP (polypropylene). The housing 2 consists at least substantially of PA (polyamide). Optionally, it is also possible for the tube connection structure 8 and/or the distributor cap 22 to consist at least substantially of PA (polyamide). The securing bracket may consist of plastic or metal.

Figure 2:
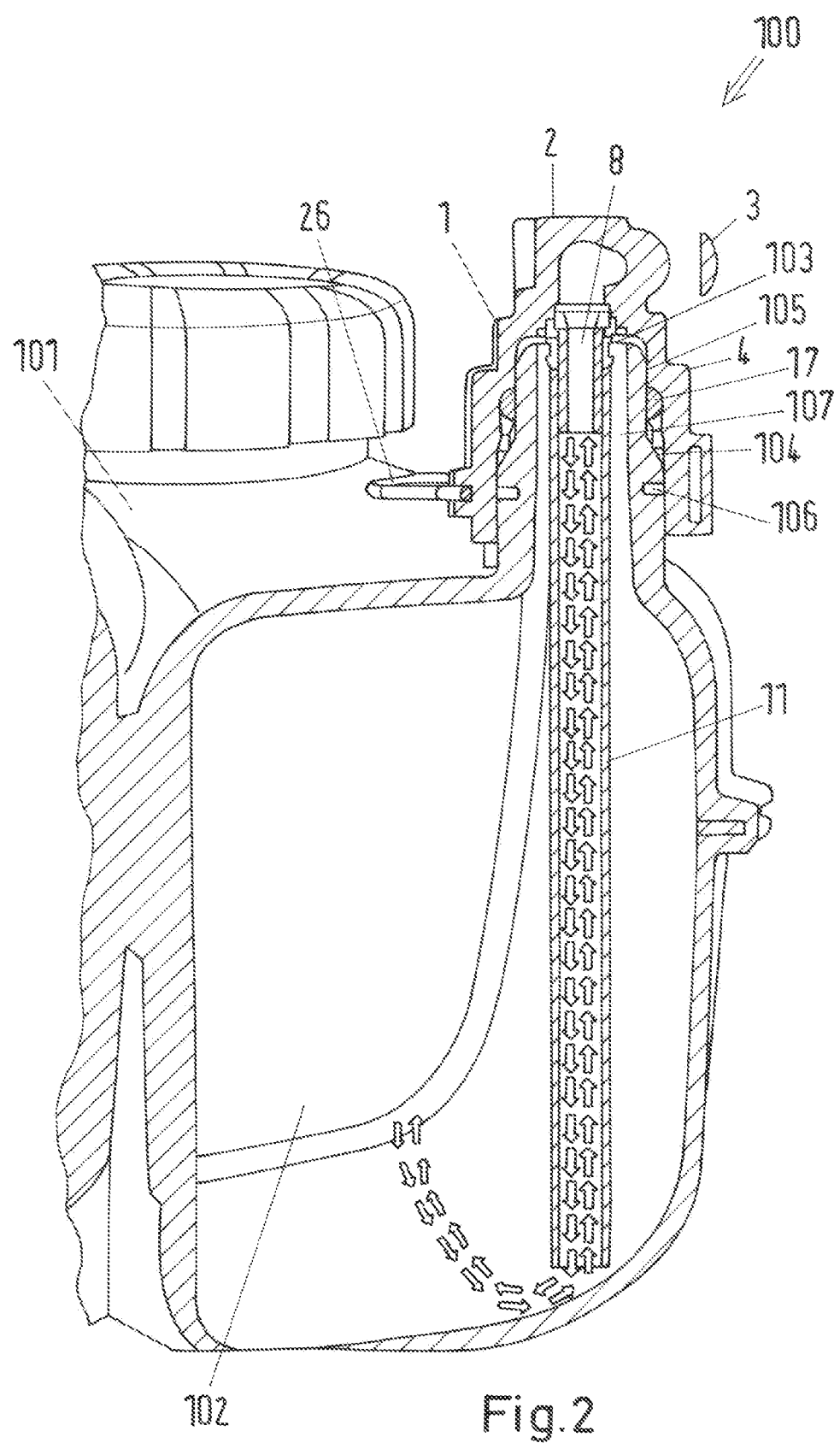
FIG. 2 shows a perspective sectional view of a container having a line coupling.

FIG. 2 shows a perspective sectional view of an embodiment of a container 100 having a line coupling 1 as per FIG. 1. However, in the case of the line coupling 1 according to FIG. 2, no distributor cap is provided at the second end of the inner tube 11. The components and configurations of the line coupling 1 thus correspond, with said exception, to those described for FIG. 1. In FIG. 2, only the housing 2, the tube connection piece 3, the housing head 4, the inner tube 11 and the securing bracket or closure means 26 are provided with reference numbers.

The container 100 has a container housing 101 which forms a container hollow space 102 and a container opening 103 which is arranged geodetically at the top. The container opening 103 is formed especially by a connection piece 104 as per FIG. 1 which is noticeably an outwardly projecting part of the container housing 101. The container opening 103 is covered by the housing head 4 of the line coupling 1, wherein the inner tube 11 of the line coupling 1 projects vertically downwards through the connection piece 104 and into the container hollow space 102. In this case, the connection piece 104 projects into the annular gap between the housing head 4 and the inner tube 11. However, an annular gap 107 remains between the inner tube 11 and the connection piece 104. In particular, the inner tube 11 and the connection piece 104 do not make contact at any position.

As can be seen, the connection piece 104 has a closure means 106 in the form of a circumferential outer groove. The latter corresponds to the closure means 26 or securing bracket of the line coupling 1. In this way, the line coupling 1 is fixed to the connection piece 104, in particular so as to be axially fixed and rotatable.

The container 100 is in particular an expansion tank. When thermally induced positive pressure prevails on sides of the first opening 6, hot fluid flows into the container hollow space 102. From the second end of the inner tube 11, the hot fluid rises in the container hollow space 102, wherein it cools, mixes with cooler fluid and, if no flows are present, is stratified by way of natural convection. If the pressure in the region of the first opening 6 drops, air which is compressed in the container hollow space 102 pushes, or negative pressure prevailing on the sides of the first opening 6 draws, fluid from the lower region of the container hollow space 102 into the second end of the inner tube 11. In this way, the coldest possible fluid is able to be conducted from the container hollow space 102 to the first opening 6.

The invention is not restricted to one of the above-described embodiments, but may be modified in a variety of ways.

All features and advantages which emerge from the claims, from the description and from the drawing, including structural details, spatial arrangements and method steps, may be essential to the invention both individually and in a wide variety of combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. Line coupling comprising a housing which has a tube connection piece and a housing head, wherein a passage duct extends from a first opening, which is formed by the tube connection piece, to a second opening, which is formed by the housing head, wherein a tube connection structure is arranged in the passage duct, wherein the tube connection structure is connected in a form-fitting manner via first coupling means to a first end of an inner tube which extends out of the housing head through the second opening, and wherein that section of the passage duct between the first opening and the tube connection structure and the inner tube form a flow duct for fluid, wherein the tube connection structure is formed by a connection element which is fixed in a form-fitting manner and/or materially bonded manner in a receiving seat of the housing, wherein the connection element forming the tube connection structure has, on the outer side, at least three cylindrical steps by way of which the connection element is seated in steps of the receiving seat, wherein an outer surface of the at least three cylindrical steps of the connection element fit closely and over the entire range of the at least three cylindrical steps with a surface, which is directed to the inside of the housing, of the steps of the receiving seat, wherein, between the inner tube and the housing head, there is formed an annular gap, which is of open form in the direction of the second opening, wherein the at least three cylindrical steps are of progressively decreasing diameter by way of which the connection element is seated in steps of the receiving seat, wherein radially-outwardly-directed sections of the outer surface of the at least three cylindrical steps of the connection element are parallel to a longitudinal axis of the passage duct adjacent the connection element, wherein axially-directed sections of the outer surface of the at least three cylindrical steps of the connection element are perpendicular to the longitudinal axis of the passage duct adjacent the connection element, wherein an intermediate cylindrical step of the at least three cylindrical steps of the connection element is unidirectional over its radially-outwardly-directed section and between preceding and succeeding axially-directed sections of preceding and succeeding cylindrical steps of the at least three cylindrical steps of the connection element, wherein a fixing ring is inserted into the housing head for retaining a sealing ring in a seal seat, the fixing ring having a substantially L-shaped cross-sectional profile.

2. Line coupling according to claim 1, wherein the tube connection structure is of sleeve-like form.

3. Line coupling according to claim 1, wherein the housing forms, on the inner side of the housing head, the seal seat in which the sealing ring is arranged.

4. Line coupling according to claim 3, wherein, on an inner side of the housing head, the housing has, in front of and/or behind the seal seat, at least one cylindrical centering step.

5. Line coupling according to claim 1, wherein the inner tube has a second end on which there is arranged a distributor cap which at least partially deflects the flow direction in the region of the second end of the inner tube.

6. Line coupling according to claim 5, wherein the second end of the inner tube is connected in a form-fitting manner via second coupling means to the distributor cap.

7. Line coupling according to claim 1, wherein closure means for the fixing of the housing head are arranged on the housing, the closure means is a securing bracket, the housing head has apertures located therein, and wherein the securing bracket is able to project into an interior of the housing head via the apertures.

8. Line coupling according to claim 1, wherein the passage duct exclusively widens in the direction of the second opening from the tube connection structure.

9. Line coupling according to claim 1, wherein the passage duct exclusively widens in the direction of the first opening from the tube connection structure.

10. Line coupling according to claim 1, wherein a butt seam is formed in the passage duct between the tube connection structure and the first opening.

11. Container having a container housing which forms a container hollow space and a container opening, wherein the container opening is formed by an outwardly projecting connection piece, and having a line coupling according to claim 1, wherein the housing head of the line coupling covers the container opening, and wherein the inner tube of the line coupling projects into the container hollow space through the connection piece of the container housing.

12. Container according to claim 11, wherein the connection piece has an outer cylindrical sealing surface which, together with the sealing ring forms a seal.

13. Container according to claim 11, wherein the connection piece has closure means which correspond to closure means of the housing of the line coupling such that the housing head is fixed to the connection piece.

14. Container according to claim 11, wherein the annular gap is formed between the inner tube and the connection piece, wherein the inner tube and the connection piece do not make contact at any position.

15. Container according to claim 11, wherein the connection piece has, on the outside, at least one cylindrical centering step which corresponds to a cylindrical centering step of the housing head.

16. Line coupling according to claim 1, wherein the connection element forming the tube connection structure has, on the outer side, exactly three, cylindrical steps by way of which the connection element is seated in steps of the receiving seat.

17. Line coupling according to claim 1, wherein surface-to-surface contact is made between the outer surface of the at least three cylindrical steps and the surface of the steps of the receiving seat.

18. Line coupling according to claim 1, wherein all of the at least three cylindrical steps of the connection element are unidirectional over their full radially-outwardly-directed sections.

19. Line coupling according to claim 1, wherein the at least three cylindrical steps of the connection element and the steps of the receiving seat lack female and male threadings thereamong.

* * * * *